UNITED STATES PATENT OFFICE.

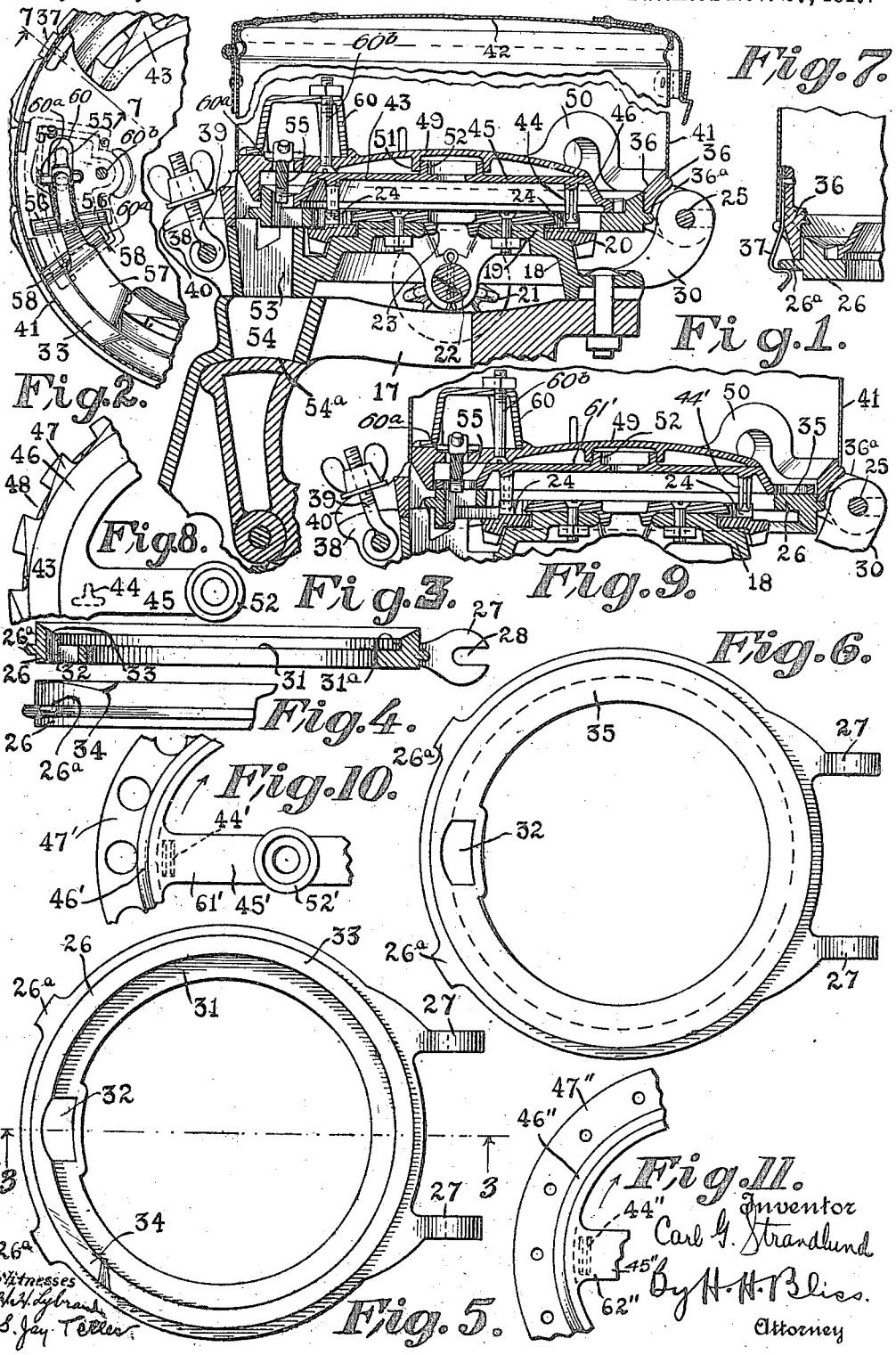
C. G. STRANDLUND.
PLANTING MECHANISM.
APPLICATION FILED OCT. 21, 1914.
1,247,738. Patented Nov. 27, 1917.

CARL G. STRANDLUND, OF MOLINE, ILLINOIS, ASSIGNOR TO DEERE & COMPANY, OF MOLINE, ILLINOIS, A CORPORATION OF ILLINOIS.

PLANTING MECHANISM.

1,247,738.  Specification of Letters Patent.  Patented Nov. 27, 1917.

Application filed October 21, 1914. Serial No. 867,841.

*To all whom it may concern:*

Be it known that I, CARL G. STRANDLUND, a citizen of the United States, residing at Moline, in the county of Rock Island and State of Illinois, have invented certain new and useful Improvements in Planting Mechanisms, of which the following is a specification, reference being had therein to the accompanying drawing.

This invention relates to improvements in corn planters of the class in which each is provided with a seed separating and delivering mechanism comprising a seed hopper or container, a rotary seed plate having cells each adapted to receive a single kernel only, together with cut-off and knock-out devices which coöperate with the seed plate to separate individual seeds from the mass and effect their discharge from the hopper.

The general object of the invention is to provide a planter of this sort having improved mechanism permitting the use of seed plates of different sorts so that use can be made of any one of a series of interchangeable seed plates having cells of different shapes and dimensions and permitting the planting of corn in different ways or of differing seeds.

It has been proposed heretofore to provide seed separating and delivering mechanism in which use could be made of either relatively thick seed plates with peripheral cells adapted to receive single kernels of corn edgewise, or relatively thin plates with cells adapted to receive single kernels of corn flatwise; but in these previously proposed constructions there has been difficulty in securing proper coöperation between the cut-off and knock-out devices and both forms of seed plate. The object of the present invention, more specifically stated, is to provide a form of interchangeable seed plate mechanism in which difficulties, such as last referred to, are entirely obviated. A further object is to provide mechanism of the sort referred to in which the interchange of thick and thin seed plates can be effected without the insertion or removal of any extra or supplemental parts.

Of the accompanying drawings which illustrate one embodiment of the invention,

Figure 1 is a vertical sectional view through one of the seeder mechanisms showing the parts arranged for the use of a relatively thick seed plate.

Fig. 2 is a fragmentary plan view of some of the parts shown in Fig. 1, the position of the housing for the cut-off and knock-out being indicated by broken lines and the hopper wall being shown in section.

Fig. 3 is a sectional view showing the supporting ring for the seed plate.

Fig. 4 is a fragmentary side view of the supporting ring.

Fig. 5 is a plan view of the supporting ring.

Fig. 6 is another plan view showing the supporting ring inverted.

Fig. 7 is a fragmentary sectional view taken along the line 7—7 of Fig. 2.

Fig. 8 is a fragmentary plan view of the relatively thick seed plate shown in Fig. 1.

Fig. 9 is a fragmentary vertical sectional view through the seeder mechanism, this view being similar to Fig. 1 but differing in that the parts are arranged for the use of a relatively thin seed plate.

Fig. 10 is a fragmentary plan view of a relatively thin seed plate such as shown in Fig. 9.

Fig. 11 is a fragmentary plan view of another form of relatively thin seed plate.

Mounted on the front frame of the planter are the supporting brackets or castings 17, and to these are secured the seed-holding and separating mechanisms. As these are similar in construction, a showing and a detailed description of but one of them is sufficient.

Bolted to the castings 17 is a base plate 18. The plate is formed with a central circular recessed boss 19 which serves to support a drive or gear ring 20. The ring is provided on its lower side with bevel gear teeth adapted to mesh with the teeth of a bevel pinion 21 on a transverse seeder shaft 22 having a bearing at each end in a base plate 18. The gear ring 20 is held in place by a cap plate 23, bolted to the base plate 18. Upon the upper face of the gear ring is a circular series of upwardly projecting teeth 24 for a purpose to be described.

26 indicates a ring plate, hinged to the base casting at 25. It lies immediately below the seed plate, to be described, and furnishes the bottom or lower closure for the seed cells. It has a large central circular opening of a diameter sufficient to permit the seed-plate-driving parts to freely rotate.

The ring 26 is invertible, its hinged ears 27 being provided with slots 28 which adapt it to readily engage or be readily disengaged from the pivot pin 25 carried by the ears 30 on the casting 18. One side of the ring (shown uppermost in Figs. 1, 3, 4, 5 and 7) is rabbeted to provide a horizontal annular ledge 31 and a vertical circular wall $31^a$ extending entirely around the ring. This ledge is provided at 32 with an opening for a purpose to be made clear. The top peripheral part of the ring is beveled downward and inward to provide an inward sloping shelf 33. At a point near the opening 32 the inclined shelf 33 is cut away or recessed as indicated at 34 for a purpose to be described.

The other side of the ring (shown uppermost in Figs. 6 and 9) is entirely flat to provide a horizontal shelf or wall 35. This horizontal shelf or wall is of course interrupted by the aforesaid opening 32.

36 is a ring-like casting at the bottom of the hopper. The casing 36 is pivoted to the aforesaid pin 25 by means of the ears $36^a$. 37 is a spring latch for securing the plate 26 and the hopper bottom 36 together. The plate 26 is provided with two lugs $26^a$, $26^a$, with one or the other of which the spring latch engages according to the position of the ring. At 38 there is a lock of the common sort, formed of a bolt 39, pivoted to the base 18, and a slotted lug at 40. 41 represents the hopper, box or can, with cover 42.

43 is a relatively thick seed plate adapted to be supported on the ring 26 when the ring is arranged with the ledge 31 and the inclined shelf 33 uppermost as shown in Fig. 1. The plate is provided with downward projecting lugs 44 which engage aforesaid teeth 24 on the gear ring 20. The plate has an upper part 45 in the form of a horizontal cross bar, an outward and downward sloping part 46, and a horizontal bottom part 47 all cast in one integral piece of metal. The seed cells are indicated at 48, these being recesses in the periphery of the bottom part 47 of the plate. The cells are open at their outer sides and the vertical wall $31^a$ serves as a closure for them. The inner walls of the cells are approximately perpendicular to the radii of the plate. The shelf 31 of the ring 26 serves as the bottom wall for the cells. Each cell is intended to receive and hold only a single kernel of corn with its wider or flat faces vertical and with its longitudinal axis horizontal.

At the center of the hopper bottom there is a cap plate 49, carried by suitable bridges 50, cast integral therewith. It is dome shaped, with a flat curvature, and the kernels readily slip thereon gradually, outward and downward. The outer edge of this cap registers, approximately, with the top circular edge of the inclined or tapered part 46 of the seed plate.

The seed plate is centered by means of the cap 49, it having loose engagement therewith of such nature that it is prevented from crowding in any direction, radially, toward the surrounding wall $31^a$ of the plate 26. This centering is obtained by companion parts which loosely interengage and permit the seed plate to be separated from the cap and removed without requiring the detaching of bolts or any other fixed devices. The means shown for this are an open bottom boss or flange 51 (cast integral with the underside of the cap 49) and a hollow pin, stud or lug 52 cast with the plate 43, the latter fitting snugly in the boss 51, though detachable, as aforesaid, therefrom.

The base casting 18 and the main casting 17 are provided with alined vertical openings 53 and 54. The before mentioned aperture 32 in the ring 26 is so located that when the parts are assembled it will register with the said apertures 53 and 54. Below the aperture 54 is a valve $54^a$ adapted to be operated by a check wire mechanism in the usual way.

As the seed plate is rotated, the seed cells are brought over these openings and the seeds pass downward through them. For positively ejecting the seeds from the cells I provide a knock-out device 55 which is supported by trunnions 56 resting in notches or recesses in the hopper bottom plate 36. The knock-out is adapted to reciprocate and partly enter the cells as they pass and to force the seeds downward. In order to prevent more than a single seed from entering one sell and being carried to the point of discharge, I provide a cut-off 57, which is supported on trunnions 58 resting in recesses in the hopper bottom plate. A spring 59 engages the knock-out and the cut-off and serves to hold each of them in its lowermost position.

A cap or housing 60 secured to the cap plate 49 by a bolt $60^b$ incloses the cut-off and knock-out devices, and the outer side of this housing is so formed at its outer edge as to overlie the outer ends of the trunnions 56 and 58 so as to hold the same in position, as indicated by $60^a$ in Fig. 2 in which the position occupied by the housing is indicated by broken lines. The cut-off 57 is made relatively wide for a purpose to be set forth below and in order to permit it to approach closer to the top surface of the peripheral part 47 of the plate, the aforesaid notch or recess 34 is provided in the ring 26.

With the parts arranged as shown in Fig. 1, the said plate 43 is rotated by means of the mechanism described and each cell receives a single seed from the mass of seeds in the hopper and carries it to the point of discharge. The cut-off 57 coöperates with the plate to prevent the passage of more than a single seed in each cell and the knock-out device 55 acts to positively eject the seeds from the cells as they pass the discharge opening. It will be observed that the plate 43 is of a diameter considerably less than that of the hopper ring 36. However, the inclined shelf 33 of the ring 26 registers with the inclined surface of the ring 36 and these two inclined surfaces serve to guide kernels inward toward the cells from the peripheral parts of the hopper.

When ordinary corn is to be planted in the ordinary manner, the parts are arranged as shown in Fig. 1 and the separation of the seeds takes place as above described. It frequently happens, however, that the farmer desires to use his planter for planting seeds other than corn, as, for instance, peas or broom corn. When these other smaller seeds are to be planted, a seed plate of a different sort is required, and this must be much thinner at the cell forming part than is the plate 43 above described. One such form of plate is shown at 61' in Fig. 10 and another at 62'' in Fig. 11, the various parts in Fig. 10 being indicated by primed reference numerals and those in Fig. 11 by double primed reference numerals. These plates are provided with circular seed cells which are entirely inclosed horizontally by the middle of the plate, not being open at their outer sides as are the cells in the plate 43. These plates are in many respects similar to the plate 43, each being provided with a horizontal cross bar 45' or 45'' with a downward and outward sloping part 46' or 46'' with the centering stud 52' and with the driving lugs 44' or 44''. The peripheral part 47' or 47'', in which the aforesaid cells are formed, is, however, much thinner than the peripheral part 47 of the plate 43.

When one of the plates 61' or 62'' is to be used, the ring 26 is temporarily detached from the pin 25 and is inverted and again put in place. This inversion of the plate brings the horizontal shelf 35 uppermost and upon this shelf the peripheral part 47' or 47'' of the plate directly rests, the shelf forming the bottom wall for the cells.

The separation of the seeds takes place in a manner similar to that already described for the plate 43. It will be observed that the cut-off 57 is relatively wide so that it can act in connection with the cells in a plate such as 61', these cells extending out radially considerably farther than the cells of the plate 43. Furthermore, by virtue of the fact that the circumferential axis or center line of the seed cells has the same radius in the case of all the seed plates, whether for edgewise selection or flatwise selection of maize or for the planting of broom-corn or the like, it follows that the knock-out device is enabled to coöperate effectively with each form of seed plate.

What I claim is:—

1. In a seed separating and delivering mechanism for corn planters, the combination of a base structure, a seed hopper mounted on the base structure, and an interchangeable rotary seed plate operatively mounted in the bottom of the seed hopper, said plate being relatively thick and formed with peripheral cells adapted to hold single kernels edgewise, cell closure means providing interchangeable annular closure surfaces for the bottoms of the seed cells and an opening for the discharge of the seeds, and cut-off and knock-out devices arranged to coöperate with the seed plate to separate the individual seeds from the mass and eject them through the discharge opening, said closure means having an upstanding wall surrounding one of the closure surfaces to close the outer sides of the cells in the said thick seed plate and having the last named closure surface of smaller diameter than the other and disposed, when in operation, in a plane lower than that of the other closure surface when it is in operation, whereby when the last named closure surface is in operation use can be made of a thin seed plate with radially large cells adapted to receive single kernels flatwise and to coöperate with the aforesaid cut-off and knock-out devices.

2. In seed separating and delivering mechanism for corn planters, the combination of a base structure, a seed hopper mounted on the base structure, an interchangeable rotary seed plate operatively mounted in the bottom of the seed hopper, said plate being relatively thick and formed with peripheral cells adapted to hold single kernels edgewise, an invertible bottom plate formed on each side with annular closure surfaces for the bottoms of the seed cells and having an opening for the discharge of the seeds, cut-off and knock-out devices arranged to coöperate with the seed plate to separate the individual seeds from the mass and eject them through the discharge opening, said bottom plate having an upstanding wall surrounding one of the closure surfaces to close the outer sides of the cells in the said thick seed plate and having the last named closure surface of smaller diameter than the other and disposed, when in operation, in a plane lower than that of the other closure surface when it is in operation, whereby when the last named closure surface is in operation use can be made of a thin seed plate with radially large cells adapted to receive single kernels flatwise and to coöperate with the aforesaid cut-off and knock-out devices.

In testimony whereof I affix my signature in presence of two witnesses.

CARL G. STRANDLUND.

Witnesses:
JESSIE SIMSER,
W. G. DUFFIELD.

Copies of this patent may be obtained for five cents each, by addressing the "Commissioner of Patents, Washington, D. C."